United States Patent
Fan et al.

(10) Patent No.: US 8,462,394 B2
(45) Date of Patent: Jun. 11, 2013

(54) DOCUMENT TYPE CLASSIFICATION FOR SCANNED BITMAPS

(75) Inventors: Zhigang Fan, Webster, NY (US); Ramesh Nagarajan, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 1323 days.

(21) Appl. No.: 12/185,904

(22) Filed: Aug. 5, 2008

(65) Prior Publication Data

US 2010/0033765 A1  Feb. 11, 2010

(51) Int. Cl.
   - H04N 1/40  (2006.01)
   - G06K 5/00  (2006.01)
   - G06K 9/46  (2006.01)
   - G06K 9/36  (2006.01)

(52) U.S. Cl.
   USPC ............ 358/449; 382/190; 382/286; 235/382

(58) Field of Classification Search
   USPC ............... 358/448, 449; 707/5; 715/230, 760; 235/382; 382/190, 224, 286
   See application file for complete search history.

(56) References Cited

U.S. PATENT DOCUMENTS

| | | | |
|---|---|---|---|
| 7,292,710 B2 | 11/2007 | Fan et al. | |
| 2005/0127171 A1* | 6/2005 | Ahuja et al. | 235/382 |
| 2009/0169110 A1* | 7/2009 | Masuyama et al. | 382/198 |
| 2009/0222441 A1* | 9/2009 | Broder et al. | 707/5 |
| 2009/0235187 A1* | 9/2009 | Kim et al. | 715/760 |
| 2010/0293451 A1* | 11/2010 | Carus | 715/230 |

FOREIGN PATENT DOCUMENTS

JP   10093776   *   4/1998

* cited by examiner

Primary Examiner — Jerome Grant, II
(74) Attorney, Agent, or Firm — Fay Sharpe LLP (57) ABSTRACT

Systems and methods are described that facilitate determining an original document format for a scanned document by analyzing a bitmap thereof. Text objects are extracted from the document, binarized, and segmented to identify text. Page orientation and text size are used to distinguish between a slideshow-type document, and a word processing or spreadsheet-type document. To further distinguish between the word processing and spreadsheet types, text column structure and count is analyzed.

19 Claims, 6 Drawing Sheets

DOCUMENT TYPE CLASSIFICATION FOR SCANNED BITMAPS

BACKGROUND

The subject application relates to scanned document type classification. While the systems and methods described herein relate to identifying an original document type for a scanned document, it will be appreciated that the described techniques may find application in other classification systems, other xerographic applications, and/or other document analysis systems.

A large portion of office documents are generated using slideshow presentation applications (e.g., Power Point, etc.), word processing tools (e.g., Word, WordPerfect, etc.), spreadsheet applications (e.g., Excel, etc.). For scanned documents, the original document types (e.g., slideshow, spreadsheet, word-processing) are generally unknown. However, the document type information can be useful for many applications, particularly in scanning services. For example, document type information can be used in a database system as a searching key. Document type identification can also be applied for guiding next-level categorization, recognition, and processing. For instance, the word-processing documents may further be recognized (e.g., at the next level) as office memo, resume, letter, journal articles, etc. Spreadsheet documents can be sent for further data extraction. Slideshow slides, which are usually generated with templates, can be efficiently compressed by exploring page-to-page correlation. However, conventional scanning and electronic document storage systems do not provide such information, especially when the electronic document is generated by scanning a paper hard copy of the document.

Accordingly, there is an unmet need for systems and/or methods that facilitate scanned document type classification while overcoming the aforementioned deficiencies.

BRIEF DESCRIPTION

In accordance with various aspects described herein, systems and methods are described that facilitate identifying an original format of a scanned document. For example, a method of identifying original document type for scanned documents comprises extracting text in a document page, classifying text objects as a function of text object size, classifying page orientation as a function of statistics of text aspect ratio and neighboring character distance, generating a text column structure index, and determining whether the document page was originally created using a slide show presentation application, or one of a word processing application and a spreadsheet application, as a function of one or more of the object size classification, text size classification, page orientation classification, and the text column structure index.

According to another feature described herein, a scanned document classification system comprises a scanner that scans one or more documents, and a memory that stores the one or more documents and stores computer-executable instructions for classifying the one or more documents according to original document type, and a processor that executes the instructions, classifies the one or more documents, and outputs a document type for the one or more scanned documents on a user interface.

Yet another feature relates to an apparatus for identifying document type of a scanned document, comprising means for generating a bitmap of the scanned document, means for analyzing text size, page orientation, and column structure, of the bitmap, and means for classifying the scanned document as a slideshow presentation document when the page orientation is "landscape" and the text size is above a predetermined threshold text size. The apparatus further comprises means for classifying the scanned document as a word processing document when the page orientation is "portrait," the text size is at or below the predetermined threshold text size, and the number of text columns is at or below a predetermined threshold column number. The apparatus additionally comprises means for classifying the scanned document as a spreadsheet document when the page orientation is "portrait," the text size is at or below the predetermined threshold text size, and the number of text columns is above the predetermined threshold column number.

DETAILED DESCRIPTION

In accordance with various features described herein, systems and methods are described that facilitate distinguishing between different types of scanned documents. The described systems and methods facilitate distinguishing between scanned documents that were originally created using a word-processing application, a spreadsheet application, or a slideshow presentation application.

Figure 1:
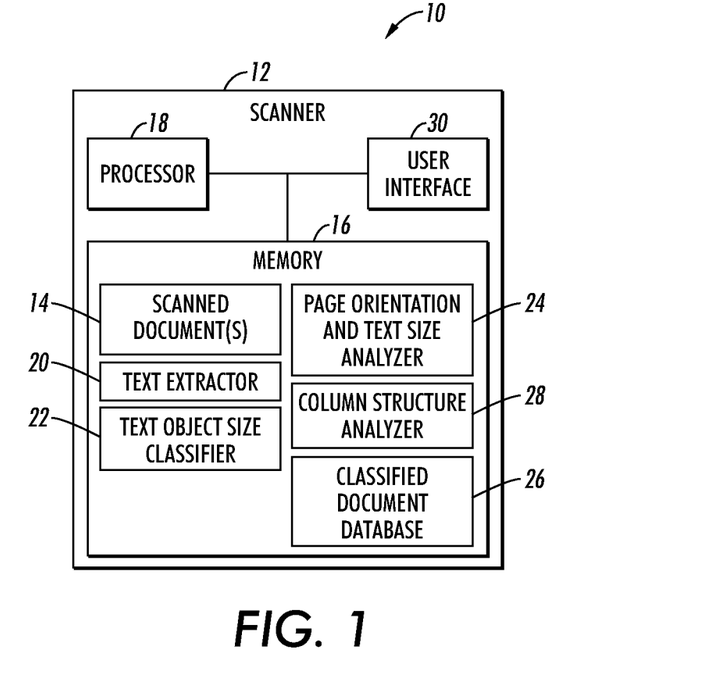
FIG. 1 illustrates a scanned document classification system comprises a scanner that scans one or more documents and stores them to a memory.

With reference to FIG. 1, a scanned document classifying system 10 comprises a scanner 12 that scans one or more documents 14 and stores them to a memory 16. The scanner 12 includes a processor 18 that executes computer-readable instructions stored in the memory 16 for classifying documents to distinguish between word-processed documents (e.g., Word documents or the like), spreadsheet documents (e.g., Excel documents or the like), and slideshow documents (e.g., PowerPoint documents or the like).

In one embodiment, the processor 18 executes a text extractor 20 (e.g., an algorithm or computer-executable instructions) to extract text from a bitmap of a scanned document 14 in a preparation step. The processor 18 then executes a text object size classifier 22 that further classifies extracted text objects according to size. The processor executes a page orientation and text-size analyzer 24 to classify the document 14 as either a slideshow (e.g., PowerPoint) document or word-processing/spreadsheet (e.g., Word/Excel) document using page orientation and text (e.g., font) size. If the document is classified as a slideshow presentation document, it is stored to a classified document database 26 as such and both the document and its classification may be recalled from the memory 16 and presented to a user via a user interface 30.

If the document is classified as word-processing/spreadsheet (e.g., not a slideshow document), it is further specifically identified as a word-processing document or a spreadsheet document in by analyzing the text column structure. For instance, the processor 18 executes a text column structure analyzer 28 to distinguish between word-processing documents and spreadsheet documents once the item is classified as other than a slideshow document. Once further classified as either a word processing document or a spreadsheet document, the classified document is stored to the classified document database 26 and may be recalled from the memory 16 and presented to a user via the user interface 30.

Upon execution of the text extractor 20 and/or the text object size classifier, the scanned document bitmaps are binarized (e.g., converted to binary data) and segmented, and the text portions of the images in the scanned document 14 are extracted. Both binarization and segmentation procedures are performed using optical character recognition (OCR) techniques and/or other document analysis systems. For instance, the scanned images are converted to gray (e.g., discarding the chrominance channels) and each pixel is compared to a predefined threshold pixel gray value to create a binary image. For example, if a pixel is below the threshold value, it is a "1" (e.g., a text pixel), and if equal to or above the threshold value it is a "0" (e.g., a background pixel). It will be appreciated that although the following description assumes "1" is a text pixel and "0" is a background pixel, the inverse may be true, as a matter of design choice, in which case the following described procedure can be modified accordingly. In one embodiment, background pixels are deemed to be white, and text pixels are deemed to be black.

Connected components (CCs) (e.g., groups of contiguous pixels having a common binary value of 1) are extracted from the binary image and are classified as normal text, large text, and non-text, according to their sizes. In one embodiment, the larger dimension of height and width of a CC is compared to two thresholds, which correspond to the heights of 96 point and 14 point characters, respectively, although it will be appreciated that other font sizes may be employed as thresholds. If the CC is smaller (or larger) than both thresholds, it is classified as normal text (or non-text). Otherwise, it is large text. Non-text may be discarded and not used in further analysis.

Upon execution of the page orientation and text size analyzer 24, page orientation, text size, are estimated from the normal text and large text CCs, and are employed by the processor 18 to distinguish slideshow documents from word-processing and spreadsheet documents. Page orientation (e.g., landscape or portrait) can be easily determined by checking the statistics about the CCs' aspect ratios (e.g., height is larger than width for most Latin characters), or by examining the statistics about the distances between the neighboring CC pairs (e.g., in Western languages, the distances are typically shorter between the left-right neighboring characters than top-bottom neighboring characters). Most, if not all, slideshow documents are printed in a landscape orientation, while most word-processing and spreadsheet documents are printed in a portrait orientation. Additionally, the dominant text size parameter (height) is calculated, and is typically much larger in slideshow documents than in word-processing and spreadsheet documents. The distinction between slideshow documents and word-processing/spreadsheet documents is made as follows: if the document is portrait, it is classified as a word-processing or spreadsheet document (e.g., not a slideshow document). Otherwise, it is classified as a slideshow document, unless its text size is no greater than 10-point.

If the document is classified as a word-processing or spreadsheet document, then the processor 18 executes the column structure analyzer 28 to distinguish between word-processing and spreadsheet. As the contents of the spreadsheet documents are mainly organized in cells, while the word-processing documents are largely arranged in text lines, these two kinds of documents have very different column structures. A text column structure index is therefore calculated as the feature for classification. The details of this procedure is described with regard to the following figures, although it will be appreciated that computer-executable instructions for the procedure are persistently stored to the memory 16 and executed by the processor 18.

Figure 2A:
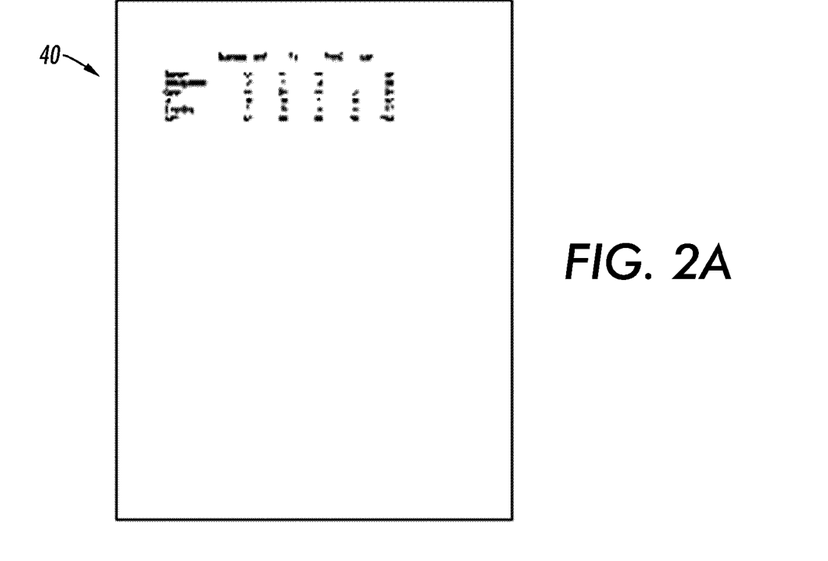
FIGS. 2A and 2B illustrate a low-resolution bitmap of a spreadsheet document and a bitmap of a word-processing document, respectively.
Figure 2B:
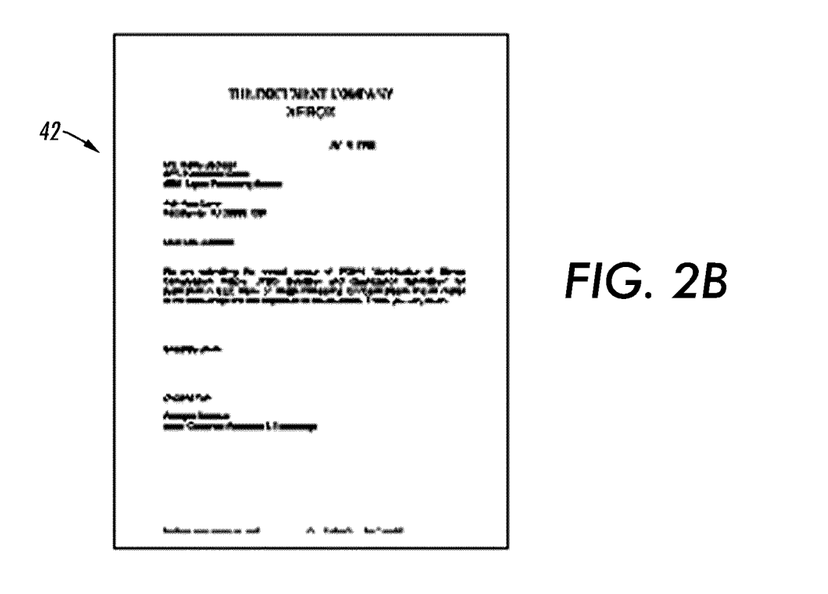

FIGS. 2A and 2B illustrate a low-resolution bitmap of a spreadsheet document 40 and a bitmap of a word-processing document 42, respectively. The contents of spreadsheet documents and word-processing documents are organized in different structures. To reduce computation and smooth out noise, the bitmaps are produced at low resolution (e.g., approximately 20 dpi), according to one embodiment. Thus, in FIGS. 2A and 2B the low-resolution text may be illegible to a human observer. Other resolutions may be employed depending on design choice, processor speed, etc. The non-text objects and the large text CCs have been removed from the bitmaps. As shown, the text spreadsheet document 40 appears as a plurality of columns, while the text in the word-processing document 42 appears as horizontal lines.

Figure 3A:
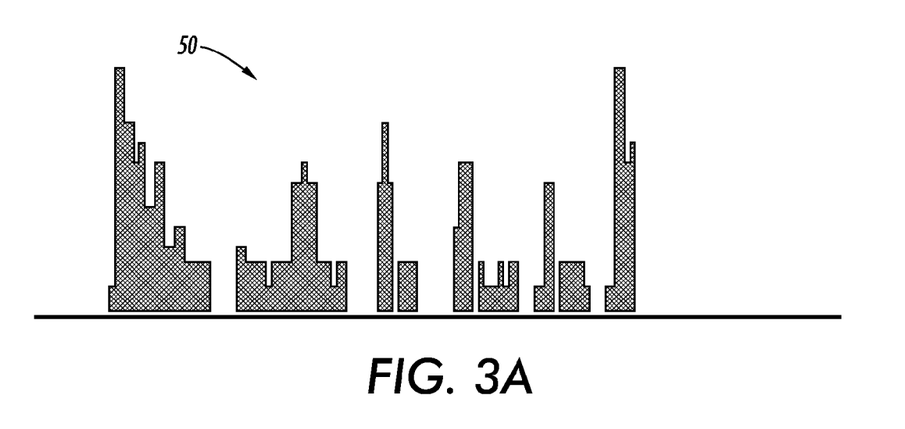
FIGS. 3A and 3B illustrate vertical profiles for the bitmaps of the spreadsheet and word-processing documents, respectively.
Figure 3B:
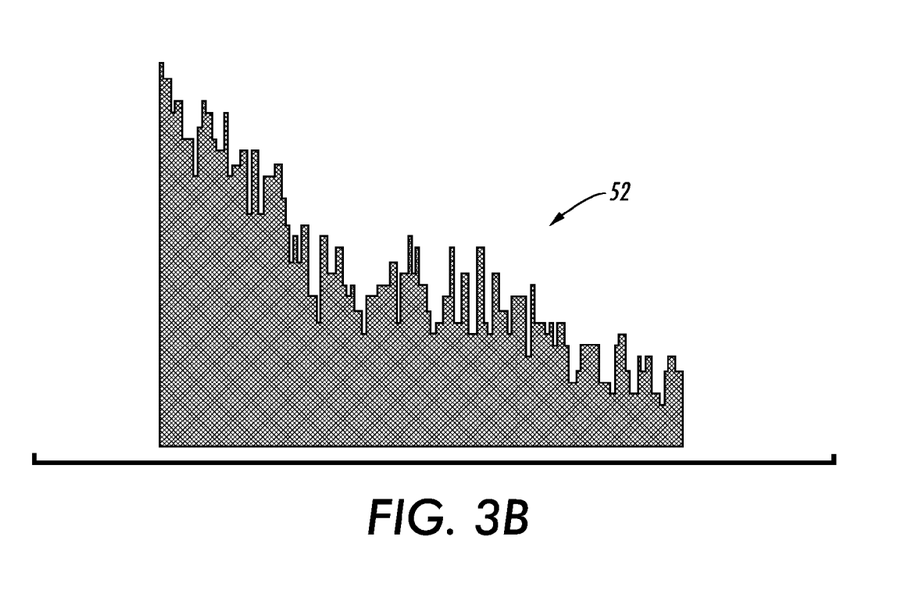

FIGS. 3A and 3B illustrate vertical profiles 50 and 52, for the bitmaps of the spreadsheet and word-processing documents 40 and 42, respectively. Structural differences are reflected in the vertical profiles 50 and 52 of the bitmaps. Each profile is produced by summarizing the bitmap pixels in vertical directions. In one embodiment, it is assumed for each pixel that 0 is background and 1 is text). The spreadsheet document profile 50 shows more columns than the word-processing document profile 52, and each column is relatively narrow. Conversely, word-processing document profiles contain fewer columns than spreadsheet document profiles, often exhibiting only one or two columns occupying one or one-half page.

Figure 4A:
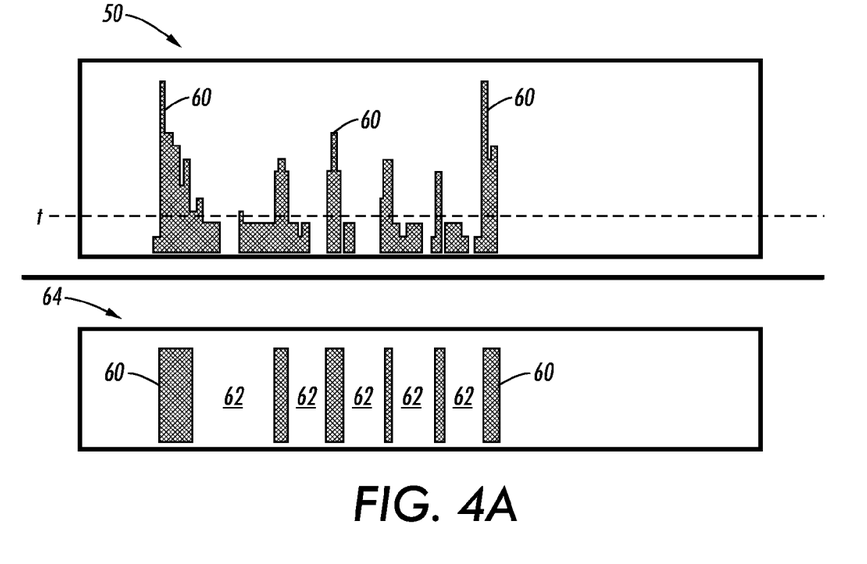
FIGS. 4A and 4B illustrate column structure analysis of the vertical profiles in which columns are extracted from the vertical profiles by locating "valleys" between the columns.
Figure 4B:
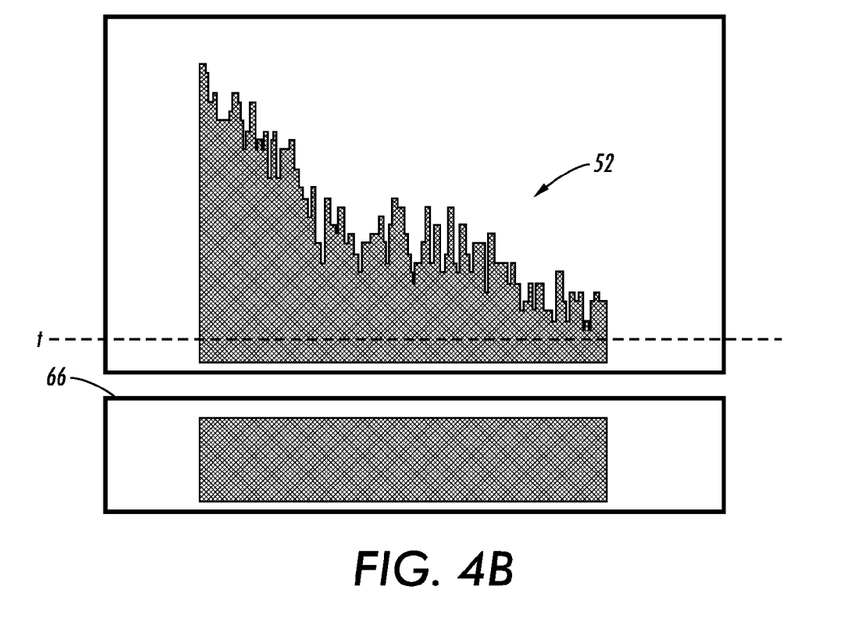

FIGS. 4A and 4B illustrate column structure analysis of the vertical profiles 50 and 52 in which columns 60 are extracted from the vertical profiles by locating "valleys" 62 between the columns 60. For instance, a vertical profile column summary 64 for vertical profile 50 shows several columns 60 separated by several valleys or gaps 62 (e.g., suggestive of a spreadsheet document. A vertical profile column summary for profile 52 shows one continuous column with no valleys (e.g., suggestive of a word-processing document).

Valleys 62 are established if the count in the profile is sufficiently small, as compared to a predetermined threshold count, t. For example, at location x, Valley(x)=1 (TRUE); if $P(x)<t$, 0 (FALSE); if $P(x) \geq t$, (1)

where $P(x)$ is the profile count at location x, and t is the threshold (shown in FIGS. 4A and 4B as dashed lines).

Figure 5A:
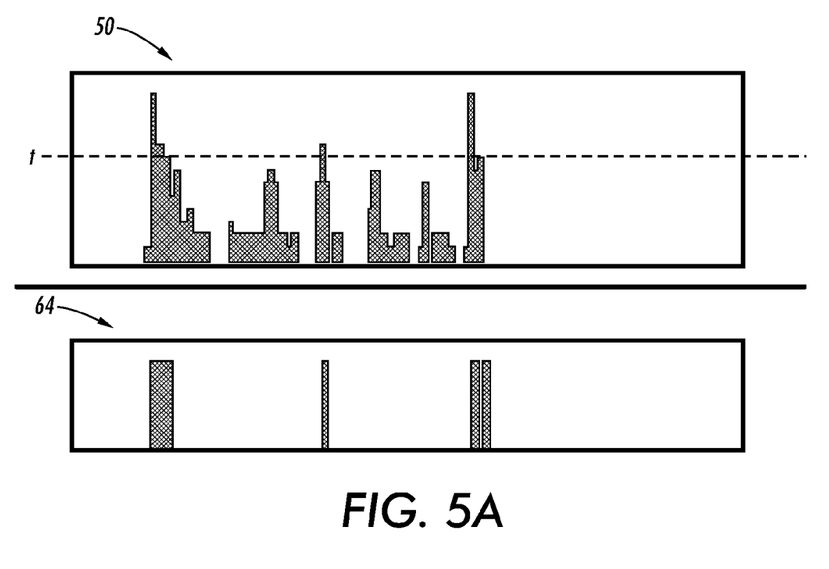
FIGS. 5A and 5B illustrates the non-triviality of threshold selection for the vertical profiles.
Figure 5B:
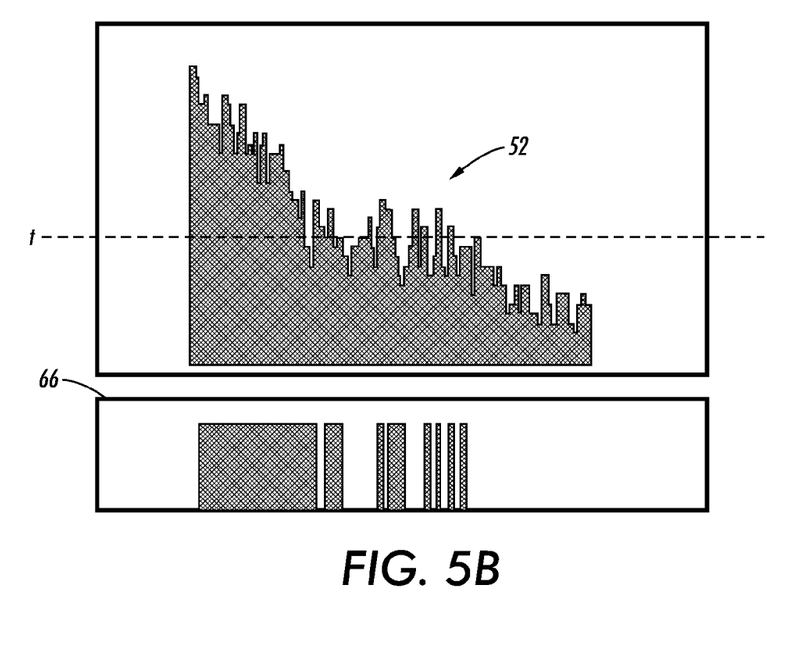

FIGS. 5A and 5B illustrates the non-triviality of threshold selection for the vertical profiles 50 and 52. That is, it is non-trivial to select a threshold t that yields reliable results. Too high or too low a threshold may generate too few columns as shown by the column summary 64 of FIG. 5A), or too many columns as shown by the column summary 66 of FIG. 5B, which may result in misclassification of a document.

Valley identification may be viewed as an optimization process. For instance, a merit function is maximized by the processor 18 with an iterative procedure. The threshold t is varied for each iteration, and each iteration comprises of two steps: a valley classification step and a valley verification step. In the classification step, the valley classification array Valley (x) is first generated using equation (1). Valley (x) is then modified by removing narrow valleys (e.g., short runs in Valley (x)). The valley that separates a short non-valley run at the left side of a page may also be deleted to prevent bullets or the like from being counted as a separate column.

In the verification step, a merit function, which reflects how well the valley fits to the data, is calculated. Specifically, the modified Valley (x) array is compared to each row of the bitmap. A row y is considered to be "fit" to the valleys if the bitmap pixel values are 0 (background) at all valley positions. For example, if at any position x, Valley(x) is 1, then bitmap (x, y) is 0. Otherwise, the row is "unfit."

In the following equation, E(t) is defined to be the total number of "unfit" rows in a page for a given threshold of t, and N(t) is the associated number of valleys. E(0) is 0 (when t=0, there is no valley and all rows are "fit"), and E(t) is an increasing function of t. The parameter t is obtained by maximizing the merit function:

$$t = \arg_t \max[kN(t) - E(t)], \quad (2)$$

where k is weighting factor (e.g., k=1.2 in one embodiment).

A column structure index C is calculated as $$C = N(t)w/W, \quad (3)$$

where w is the maximum width of the text (in pixels) and W is a constant that corresponds to the width of the writable area of a page (e.g., 130 pixels, or 6.5 inches according to one example). C is compared to a threshold T (e.g., 2, 3, 4, etc.). The document is classified as a spreadsheet if C>T. Otherwise, it is classified as a word-processing document.

The following example is provided for purposes of illustration, and is not intended to be interpreted in a limiting sense. A set of 54 documents with a total of 308 pages may include 20 slideshow documents (217 pages), 19 word-processing documents (89 pages), and 15 spreadsheet documents (52 pages). The set includes documents with different sources, styles, and sub-types (memo, letter, scientific paper, etc.). Examples of classification results for each page are summarized below in Table 1.

TABLE 1

| Original | Classification | | |
|---|---|---|---|
| Document Type | Slideshow | Word-processing | Spreadsheet |
| Slideshow | 217 (100%) | 0 | 0 |
| Word-processing | 0 | 83 (93.3%) | 6 (6.7%) |
| Spreadsheet | 0 | 2 (3.8%) | 50 (96.2%) |

As can be seen from the table, the classification accuracy on a per-page basis is high in all cases, and error-free when separating slideshow presentation documents from other types (e.g., word-processing and spreadsheet). The table also illustrates examples of errors that may occur when distinguishing between word-processing and spreadsheet documents, such as may occur when pages contain only a small number of text lines. To reduce this error rate, potentially to zero, the processor 18 may reject pages with little information (e.g., such pages may be classified as "unknown").

In another embodiment, the processor 18 classifies a multiple-page document is classified as a whole (e.g., by evaluating all page classifications in the document), to resolve ambiguity and reduce the error rate to zero. For instance, a document containing six pages, five of which are classified as word-processing documents and only one of which is classified as a spreadsheet, is classified as a word-processing document.

Figure 6:
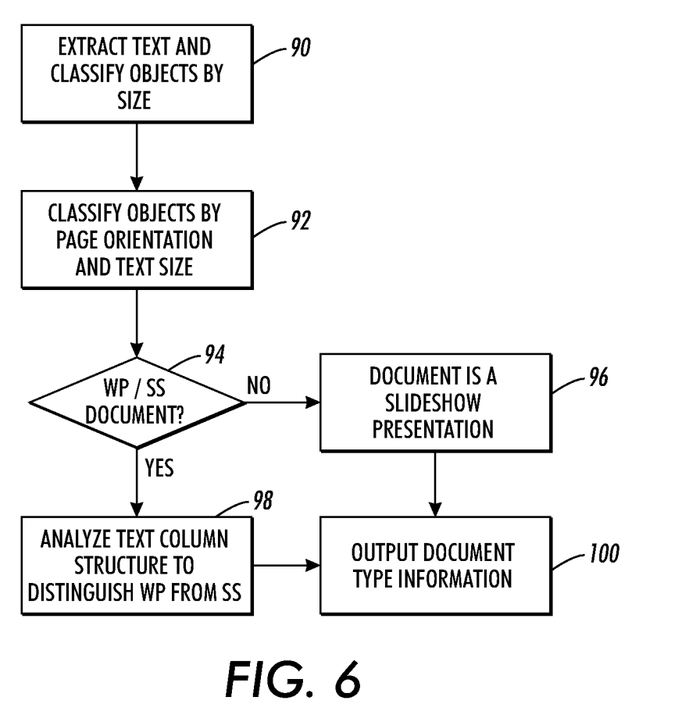
FIG. 6 illustrates a method of classifying scanned documents to identify original document type, in accordance with various aspects described herein.

FIG. 6 illustrates a method of classifying scanned documents to identify original document type, in accordance with various aspects described herein. In one embodiment, the method facilitates document type classification for scanned documents to identify from a bitmap of a given scanned document whether a document is originally generated by a word-processing application (e.g., Word, WordPerfect, etc.), a spreadsheet application (e.g., Excel or the like), or slideshow presentation application (e.g., PowerPoint or the like). At 90, as preparation step is performed wherein text in a document page is extracted, and text objects are classified as a function of object size.

During document preparation at 90, scanned document bitmaps are binarized and segmented, and the text portions of the images are extracted. For instance, the scanned images are converted to gray (e.g., discarding the chrominance channels) and "thresholded" to create a binary image. Connected components (CCs) are extracted from the binary image and are classified as normal text, large text, and non-text, according to their sizes. For example, the larger dimension of height and width of a CC is compared to two thresholds. In one embodiment, the two thresholds correspond to the heights of a largest-point (e.g., 96, 100, etc.) and a standard text point (e.g., 10, 12, 14, etc.) font characters, respectively. If the CC is smaller (or larger) than both thresholds, it is classified as normal text (or non-text). Otherwise, it is large text. Non-text may be discarded.

At 92, the document is classified as a word-processing/spreadsheet document, or a slideshow presentation document, by classifying the documents according to page orientation and text size. For instance, page orientation and text size are estimated from the normal text and large text CCs. Page orientation (e.g., landscape or portrait) is determined by checking the statistics about the CCs' aspect ratios (e.g., height is larger than width for most Latin characters), and/or by examining the statistics about the distances between the neighboring CC pairs (e.g., in Western languages, the distances are typically shorter between the left-right neighboring characters than between top-bottom neighboring characters). Predominant text size (e.g., height) is also determined, and is typically much larger in slideshow presentation documents than in word-processing or spreadsheet documents.

At 94, a determination is made regarding whether the document is a word-processing/spreadsheet document. For instance, if the document page orientation is portrait, it is considered to be a word-processing or spreadsheet document. Otherwise, it is determined to be a slideshow presentation document (e.g., unless its text size is no greater than a predetermined standard text point, such as 10, 12, or 14-point). If the determination at 94 is negative, then the document is a slideshow presentation document and is classified as such, at 96. Document type information is then output at 100, which may comprise storing the document and type information to memory, outputting the type information to a user, etc.

If, at 94, the determination is positive, then at 98 the document is further identified as either a word-processing document or a spreadsheet document by analyzing the text column structure. For example, since the contents of spreadsheet documents are typically organized in cells, while word-processing documents are largely arranged in text lines, these two kinds of documents have very different column structures. The analysis of the document type at 98 thus comprises calculation of a text column structure index as the feature for classification, which is described above with regard to the preceding figures.

Based on the analysis at 98, the document is classified as either a word-processing document or a spreadsheet document, and the document type information is output at 100, which may comprise storing the document and type information to memory, outputting the type information to a user, etc.

In another embodiment, pages with a landscape orientation are not constrained to being classified as slideshow documents, but rather may be classified as spreadsheet documents using one or more of the text-size information, the column/valley analysis information, and the like.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of identifying original document type for scanned documents, comprising:
   extracting text in a document page;
   classifying text objects as a function of text object size;
   classifying page orientation as a function of statistics of text aspect ratio and neighboring character distance;
   generating a text column structure index;
   determining whether the document page was originally created using a slide show presentation application, or one of a word processing application and a spreadsheet application, as a function of one or more of the object size classification, text size classification, page orientation classification, and the text column structure index.

2. The method of claim 1, wherein extracting text comprises binarizing and segmenting scanned document bitmaps.

3. The method of claim 2, wherein binarizing and segmenting comprises converting scanned images to gray and thresholding the binarized images to identify pixels therein as black or white pixels, and wherein the text size classification includes extracting connected components from the binary image and classifying the connected components as normal text, large text, and non-text, according to their sizes.

4. The method of claim 3, wherein the document page is classified as a slide show presentation document page when the page orientation is "landscape" and the text size is classified as large text.

5. The method of claim 3, wherein the document page is classified as one of a word processing document or a spreadsheet document when the page orientation is not landscape or the text size is classified as normal text.

6. The method of claim 5, wherein text is classified as normal text when it is less than or equal to a predetermined text size, and classified as large text when it is larger than the predetermined text size.

7. The method of claim 6, further comprising wherein the predetermined text size is in the range of approximately 6-point text to approximately 18-point text.

8. The method of claim 5, further comprising classifying all document pages in a scanned document, and classifying the scanned document as a function of the classification of a majority of document pages therein.

9. The method of claim 1, further comprising determining whether the document page was originally created using a word processing application or a spreadsheet application as a function of text column structure.

10. The method of claim 9, wherein the text column structure index identifies a number of text columns C on the document page and gaps therebetween.

11. The method of claim 10, wherein the document page is determined to be a spreadsheet document page when the number of columns C is greater than a predetermined column threshold number, T, and a word processing document page when the number of columns C is less than or equal to the predetermined column threshold number, T.

12. The method of claim 11, wherein the predetermined column threshold number T is in the range of approximately two to four.

13. A scanned document classification system, comprising:
   a scanner that scans one or more documents;
   a memory that stores the one or more documents and stores computer-executable instructions for classifying the one or more documents according to original document type; and
   a processor that executes the instructions, classifies the one or more documents, and outputs a document type for the one or more scanned documents on a user interface;
   wherein the memory stores, and the processor executes, instructions for:
      extracting text in a document page;
      classifying text objects as a function of text object size;
      classifying page orientation as a function of statistics of text aspect ratio and neighboring character distance;
      generating a text column structure index;
      determining whether the document page was originally created using a slide show presentation application, or one of a word processing application and a spreadsheet application, as a function of one or more of the object size, text size, page orientation classifications, and the text column structure index.

14. The system of claim 13, wherein:
   the instructions for extracting text comprise instructions for binarizing and segmenting scanned document bitmaps; and
   the instructions for classifying text size include instructions for extracting connected components from the binary image and classifying the connected components as normal text, large text, and non-text, according to their sizes.

15. The system of claim 14, wherein the processor classifies the document page as a slide show presentation document page when the page orientation is "landscape" and the text size is classified as large text, and as a one of a word processing document or a spreadsheet document when the page orientation is not landscape or the text size is classified as normal text, as a function of a comparison to a predetermined threshold text size.

16. The system of claim 15, wherein the memory stores, and the processor executes, instructions for:
   determining a number of text columns C on the document page, and gaps therebetween, to distinguish between a word processing document page and a spreadsheet document page;
   wherein the processor identifies the document page as a spreadsheet document page when the number of columns C is greater than a predetermined column threshold number, T, and as a word processing document page when the number of columns C is less than or equal to the predetermined column threshold number, T.

17. The system of claim 16, wherein the predetermined column threshold number T is in the range of approximately two to four columns.

18. The system of claim 16, wherein the memory stores, and the processor executes, instructions for classifying all document pages in a scanned document, and classifying the scanned document as a function of the classification of a majority of document pages therein.

19. An apparatus for identifying document type of a scanned document, comprising:
- means for generating a bitmap of the scanned document;
- means for analyzing text size, page orientation, and column structure, of the bitmap;
- means for classifying the scanned document as a slideshow presentation document when the page orientation is "landscape" and the text size is above a predetermined threshold text size;
- means for classifying the scanned document as a word processing document when the page orientation is "portrait," the text size is at or below the predetermined threshold text size, and the number of text columns C is at or below a predetermined column threshold number T; and
- means for classifying the scanned document as a spreadsheet document when the page orientation is "portrait," the text size is at or below the predetermined threshold text size, and the number of text columns C is above the predetermined column threshold number T.

* * * * *